(12) United States Patent
Iwaizono et al.

(10) Patent No.: US 6,322,921 B1
(45) Date of Patent: *Nov. 27, 2001

(54) SECONDARY BATTERY AND SEALING PLATE ASSEMBLY THEREFOR

(75) Inventors: Yoshinori Iwaizono, Okayama; Kenjin Masumoto, Kishiwada; Shinji Tsurutani, Hirakata, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,037

(22) PCT Filed: Jul. 8, 1997

(86) PCT No.: PCT/JP97/02363

§ 371 Date: Mar. 9, 1998

§ 102(e) Date: Mar. 9, 1998

(87) PCT Pub. No.: WO98/01913

PCT Pub. Date: Jan. 15, 1998

(30) Foreign Application Priority Data

Jul. 9, 1996 (JP) .................................................. 8-178896
Jan. 29, 1997 (JP) .................................................. 9-015462

(51) Int. Cl.$^7$ ............................. H01M 2/12; H01M 10/48
(52) U.S. Cl. .................................. 429/56; 429/59; 429/61
(58) Field of Search .................................. 429/7, 53, 56, 429/57, 59, 61, 62

(56) References Cited

U.S. PATENT DOCUMENTS

| | | | |
|---|---|---|---|
| 4,289,836 | * | 9/1981 | Lemelson ................................ 429/61 |
| 5,391,974 | * | 2/1995 | Shiojima et al. . |
| 5,449,570 | * | 9/1995 | Inkmann et al. . |
| 5,622,789 | * | 4/1997 | Young . |
| 5,741,606 | * | 4/1998 | Mayer et al. ............................ 429/53 |
| 5,895,728 | * | 4/1999 | Walker et al. .......................... 429/53 |

FOREIGN PATENT DOCUMENTS

| | | |
|---|---|---|
| 19524870A1 | 2/1996 | (DE) . |
| 644642 | 3/1995 | (EP) . |
| 58-188066 A | * 11/1983 | (JP) . |
| 2-78151 | 3/1990 | (JP) . |
| 6-215747 | 8/1994 | (JP) . |
| 7-254401 | 10/1995 | (JP) . |
| 8-7866 | 1/1996 | (JP) . |
| 8-64197 | 3/1996 | (JP) . |
| WO 93/23887 | 11/1993 | (WO) . |
| WO 96/08846 | 3/1996 | (WO) . |

* cited by examiner

*Primary Examiner*—Gabrielle Brouillette
*Assistant Examiner*—Susy Tsang
(74) *Attorney, Agent, or Firm*—Ratner & Prestia

(57) ABSTRACT

A secondary battery which may be handled in a same way as conventional single cell, if the gas pressure within battery went unusually high the gas is immediately discharged outside, and bursting of the battery is prevented. Sealing portion of the secondary battery is composed by a flexible circuit board having an aperture and a safety circuit mounted thereon, a plus terminal for input/output of control provided with a gas discharge aperture and minus terminal for safety circuit provided with a gas discharge aperture which keep a surface contact with the flexible circuit board at the upper surface and are connected respectively to the safety circuit by wirings, a PTC element keeping a surface contact with the flexible circuit board at the reverse surface, a vent having a slit and is attached to the reverse surface of PTC element, the above members being united into a one-piece unit by an inner gasket, and a subfilter having an aperture and is welded to said vent at the center, which is clamped, together with the inner gasket, by the circumferential edge of an aperture-bearing filter.

26 Claims, 17 Drawing Sheets

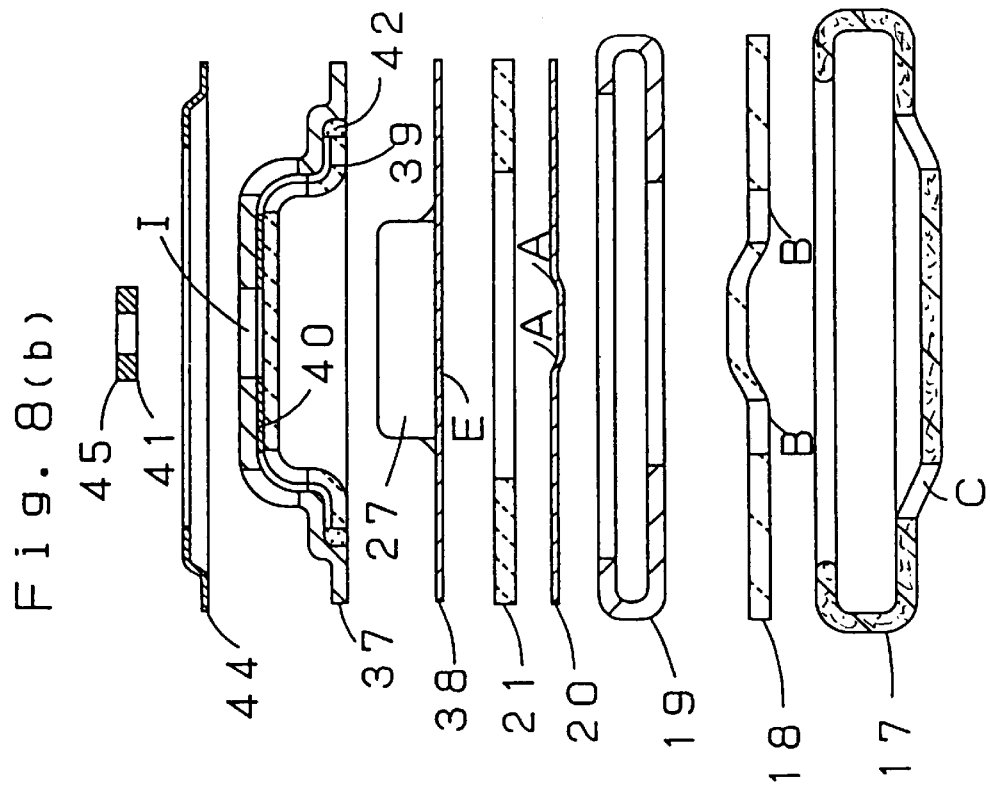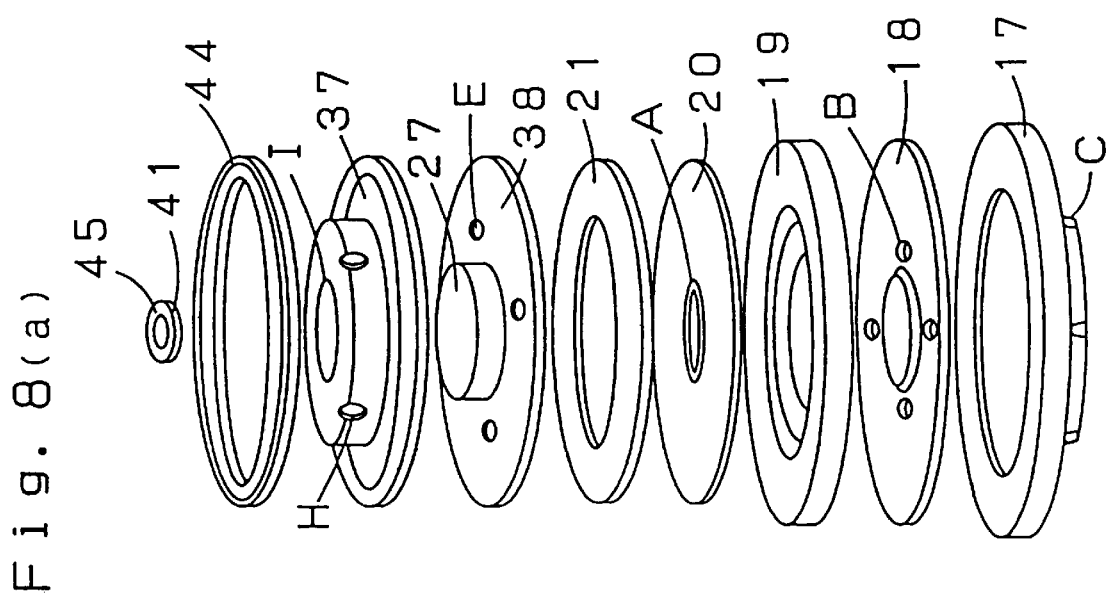

SECONDARY BATTERY AND SEALING PLATE ASSEMBLY THEREFOR

This Application is a U.S. National Phase Application of PCT International Application PCT/JP97/02363.

TECHNICAL FIELD

The present invention relates to a sealed-type secondary battery, for example a lithium-ion secondary battery, incorporating a safety device; more specifically, a secondary battery in which an electric circuit of the safety device is made compact for inclusion within a sealing plate of the battery, and a sealing plate assembly containing the safety device for a secondary battery.

BACKGROUND ART

Because of high energy density, the sealed type secondary batteries, lithium-ion secondary batteries among others, are being increasingly used as the power source for driving compact portable appliances such as video camera, portable telephone, personal computer, etc. It is essential for the lithium-ion secondary batteries to have a safety device containing an electric circuit in order to protect the battery against over-charging, over-discharging and excessive electric current. Therefore, such batteries are normally packed in a so-called battery package incorporating an electric circuit working as the safety circuit, designed for installation in an appliance.

FIG. 1 is a conceptual drawing of a battery package containing lithium-ion secondary batteries; where, numeral 1 denotes a case to house cylindrical lithium-ion secondary batteries 2 and 3 designed to have a shape suitable for installation in a certain specific appliance, 4 is a safety circuit disposed between the lithium-ion secondary batteries 2, 3 and a terminal of the case 1.

FIG. 17 is a block diagram of a conventional safety circuit 4; where, the positive voltage supplied from a battery charger flows through a plus terminal 5, a PTC element 6, lithium-ion secondary batteries 3, 2, FETs 7, 8, a thermal fuse 9 and terminal 10, ultimately to the negative end of battery charger. The lithium-ion secondary batteries 2, 3 are charged in the above manner.

The lithium-ion batteries 2, 3 discharge through PTC element 6, plus terminal 5, a plus and a minus terminals of an appliance, minus terminal 10, thermal fuse 9 and FETs 8, 7. Voltage detectors 11, 12 for watching battery voltage are coupled to a control circuit 13; which circuit turns FET 8 OFF when the battery voltage goes beyond a specified value to prevent over-charging, and turns FET 7 OFF when the battery voltage goes lower than a specified value to cut the electric current for preventing over-discharging. A voltage detector 14 which detects the source-drain voltage of the FET 7 is coupled to the control circuit 13; which circuit turns the FETs 7 and 8 OFF to cut the electric current when an excessive electric current goes between the plus terminal 5 and minus terminal 10 due to short-circuiting etc. in outside. A thermistor 15 is for monitoring battery temperature from a battery charger, or an appliance, through a terminal 16.

As described in the above, a conventional battery package contains in its case 1 a safety circuit 4 comprised of preventive means against over-charging, over-discharging of battery, electric current cutting means against excessive electric current flow, battery temperature monitor, etc. mounted on a printed circuit board.

The conventional battery package, however, is accompanied with following drawbacks.

1) Most of the battery packages are packed in their case 1 of specific design dedicated to each of respective shapes of appliances they serve, for the ease of installation.

2) Dedicated battery charger is needed for each of the respective appliances, because case 1 has its own specific design dedicated to each of the respective appliances, and a battery charger has to comply with the shape of case 1.

3) Safety circuit and structure of terminals adapted to the shape of an appliance occupy a substantially bulky space relative to the space for lithium-ion secondary batteries 2, 3.

4) Lithium-ion secondary batteries or other secondary batteries alone are not readily available for ordinary consumers. The conventional battery packages lack versatility.

DISCLOSURE OF THE INVENTION

The invented secondary battery contains an electric circuit working as the safety device inside the battery; by so doing, a secondary battery having a built-in safety device is made available, which secondary battery may be handled as an independent battery in a same way as ordinary batteries.

The electric circuit may be incorporated in a sealing plate of the battery.

The present invention also presents a sealing plate which can discharge the gas within battery outside breaking a vent when the inner gas pressure is raised unusually high by some reason, as well as a secondary battery having such sealing plate.

A first exemplary embodiment of the present application refers to a secondary battery with which a safety circuit containing a current cutting element is incorporated in a sealing member for capping a battery. The safety circuit may be formed compact taking advantage of a high-density integration technology of semiconductors, a miniaturizing technology for components, and a technology for mounting such components in high-density; and such a miniaturized safety circuit may be housed entirely in a small space such as that formed between a sealing cap disposed at the top part of a battery and a current cutting valve, which space never be exposed to the electrolyte under normal conditions. Each of the secondary batteries having such a built-in safety circuit may be handled independently in a same way as an ordinary battery to be installed in a battery chamber of an appliance.

Another aspect of the present application refers to a secondary battery according to the first exemplary embodiment, with which the safety circuit is treated with a water-resistive, anti-electrolyte resin such as epoxy resin, polybutylene terephthalate resin. The safety circuit is protected against water coming from outside or electrolyte from within.

Another aspect of the present application refers to a secondary battery according to the first exemplary embodiment, with which an opening or a break-down structure is provided in a circuit substrate board on which a safety circuit is formed. In case the electrolyte or gasified electrolyte sneak into the area of safety circuit, it may be discharged outside through an aperture of a cap, via the opening or the break-down structure provided in the circuit board substrate of safety circuit.

Yet another aspect of the present application refers to a secondary battery according to the first exemplary embodiment, with which a thermal fuse is provided in a safety circuit. The thermal fuse melts down with heat generated from current cutting element like an FET or the battery itself to break the electrical connection between the positive electrode of battery and the plus terminal for supply outside.

Another aspect of the present application refers to a secondary battery according to the first exemplary embodiment, with which a thermistor is provided in a safety circuit. The safety of a battery is secured by specifying temperature range for charging a battery.

Another aspect of the present application refers to a secondary battery according to the first exemplary embodiment, with which the plus output of a battery is connected to a safety circuit via a PTC element. The PTC element may be tripped by heat generated from current cutting element like an FET.

Yet another aspect of the present application refers to a secondary battery according to the first exemplary embodiment, with which a PTC element is provided between the plus terminal for safety circuit and the plus terminal for inputting/outputting with outside. The PTC element may be tripped with an excessive current caused by e.g. short-circuiting of battery output, heat of a battery, or by heat of the safety circuit.

A second exemplary embodiment of the present application refers to a secondary battery according to the first exemplary embodiment, with which a sealing cap is comprised of two terminals, a minus terminal for safety circuit and a plus terminal for inputting/outputting with outside. With the above structure, electricity consumption does not take place at the safety circuit unless a minus terminal at the outer surface or at the bottom of battery and the minus terminal for safety circuit are coupled together at an appliance, or a battery charger. Thus, anti-over-discharge means may be eliminated in a battery.

Another aspect of the present application refers to a secondary battery according to the second exemplary embodiment, with which the minus terminal for safety circuit is disposed on a level different from that of the plus terminal for inputting/outputting with outside. This structure contributes to reduce a chance of the possible external short-circuiting which might occur during handling of a battery.

Another aspect of the present application refers to a secondary battery according to the second exemplary embodiment, with which the minus terminal for safety circuit and the plus terminal for inputting/outputting with outside are glued together with an electrically insulating glue, or are assembled together via an insulating material. This structure contributes to assure mechanical strength needed for the cap as a whole, and to firmly fix the minus terminal for safety circuit and the plus terminal for inputting/outputting with outside on the cap and to secure good insulation between the two.

Another aspect of the present application refers to a secondary battery according to the second exemplary embodiment, with which the diameter of gas discharge aperture provided in a plus terminal for inputting/outputting with outside is larger than the diameter of gas discharge aperture provided in a minus terminal for safety circuit. This structure contributes to reduce a possibility of electrical short-circuiting that might happen at the vicinity of gas discharge aperture of the cap.

A third exemplary embodiment of the present application refers to a secondary battery which comprises a battery case for housing an electro-generating element which case functioning also as a terminal representing one polarity of the electro-generating element, and a sealing plate assembly affixed to open end of the battery case via a gasket; wherein, the sealing plate assembly is comprised of an inner cap and an outer cap electrically insulated to each other and a vent made of thin metal plate which breaks at a certain specified pressure functioning as electric current cutting means that disconnects electrical conduction prior to the breakage, one cap among said caps being electrically connected via the vent to the other polarity of the electro-generating element, both of the caps being provided respectively with gas discharge apertures, and an open cavity connecting the above apertures through is provided between caps.

A fourth exemplary embodiment of the present application refers to a secondary battery which comprises a battery case for housing an electro-generating element which case functioning also as a terminal representing one polarity of the electro-generating element, and a sealing plate assembly affixed to open end of the battery case via a gasket; wherein, the sealing plate assembly is comprised of a printed board which has an aperture or a break-down mechanism for discharging gas and an electric circuit mounted thereon containing an electric current cutting element connected in series to the battery and a voltage detector for detecting the battery voltage to control the above electric current cutting element, an outer cap and an inner cap fixed on the above printed board which caps being connected respectively to a terminal of one polarity and a terminal of the other polarity of the printed board, a vent made of thin metal plate which breaks at a certain specified pressure provided at a place inner than the above printed board and functions as electric current cutting means that disconnects electrical conduction prior to the breakage, and electrical connecting means for electrically connecting a terminal of the printed board coupled with one of the caps to an electrode of the other polarity of the electro-generating element via the above vent; both of the caps being provided respectively with gas discharging apertures, an open cavity connecting the above apertures through is provided between the two caps, and when the battery is installed in an appliance the above electric circuit is connected via other cap with said terminal representing one polarity.

A structure that is common with the third and fourth exemplary embodiments as above, is an open cavity connecting the apertures of the two caps through provided between the outer cap and the inner cap. If the gas pressure within a battery rise unusually high to break the vent, it enters into the open cavity through the aperture of inner cap. The open cavity makes it easy for the gas to proceed to the aperture of outer cap to be discharged outside. The danger of battery burst is thus avoidable. The open cavity may not be needed if the apertures of two caps are disposed at a same location facing each other. However, in order to have the caps assembled to such a structure an additional step of assembly work is required for aligning the apertures. Moreover, the structure of aligned apertures bears a practical drawback that it allows wire-shaped foreign metal item like a hairpin to intrude through the aligned apertures, causing unwanted electrical contact between the caps, resulting in short-circuiting of the battery. The assembly in accordance with the present invention does not require any additional control of aligning the apertures, and a sealing plate thus assembled presents a reduced possibility of short-circuiting by a wire-shaped foreign metal item.

Another aspect of the present application refers to a secondary battery according to the fourth exemplary embodiment, with which an electric current cutting element contained in the electric circuit is controlled so as to prevent the incoming of excessive current to a battery, the outgoing of excessive current from a battery, or the inputting/outputting of excessive current. This feature, added to the fourth exemplary embodiment implements a secondary battery having a built-in safety circuit that can be treated in a same way as conventional batteries and installed easily in a battery chamber of an appliance.

Another aspect of the present application refers to a secondary battery according to the third embodiment or fourth, with which the gas discharge aperture is provided in each of the respective caps at the side, and the open cavity is formed inside an outward extrusion provided in the outer cap at the side. This structure enables the maximum utilization of a space inside the inner cap.

The above described extrusion is provided at the upper circumference of outer cap according to another aspect of the present invention.

The extrusion may be utilized also as an element of snapping hook when attaching the battery to a terminal of an appliance.

Another aspect of the present application refers to a secondary battery, with which the aperture of outer cap is disposed at a level lower than that of inner cap. With such a structure, the possibility of short-circuiting of a battery which might be caused by a wire-shaped foreign metal item like a hairpin intruding through the aperture of outer cap into the open cavity to make electrical contact between the two caps may be avoided.

Another aspect of the present application refers to a secondary battery according to the fourth exemplary embodiment, with which the electrical connecting means contains a PTC element. The PTC element may be tripped by heat generated by a current cutting element such as an FET. Instead of being built in the electrical connecting means, the PTC element may be incorporated in an electric circuit mounted on said printed board.

Another aspect of the present application refers to a secondary battery according to the fourth exemplary embodiment, with which the electrical connecting means contains a subfilter which is welded to the vent at the center while electrically insulated at the circumference, the subfilter having an aperture which allows gas to go through, the welded portion of said subfilter with said vent is broken to cut the electrical contact between the subfilter and the vent when the gas pressure posed on vent goes higher than a certain specific value, which means that it works as current cutting means. This structure disconnects the electric current when battery temperature is driven high by over-charging or by large discharge current.

Another aspect of the present application refers to a secondary battery according to the fourth exemplary embodiment, with which an electric circuit containing the current cutting element connected in series to the battery and a voltage detector for detecting battery voltage to control said current cutting element is integrated and put into a single package having terminals equivalent to those of said printed board, the single package being disposed in place of said printed board. With such a structure, the printed board may be eliminated, and a space between the terminals provides a discharging channel for gasified electrolyte.

A fifth exemplary embodiment of the present application refers to a sealing plate assembly for a secondary battery, which sealing plate assembly comprises an inner cap and an outer cap electrically insulated to each other, a vent comprised of a thin metal plate which breaks at a certain specific pressure functioning as current cutting means for disconnecting electrical conduction prior to the breakage, and means for electrically coupling one cap among said caps to an electrode of one polarity of the electro-generating element via said vent, each of the two caps having a gas discharge aperture, and an open cavity connecting said apertures through is provided between the two caps. A secondary battery according to the third exemplary embodiment may be presented by using such a sealing plate assembly.

A sixth exemplary embodiment of the present application refers to a sealing plate assembly for a secondary battery which includes a printed board having an aperture or a break-down mechanism for discharging gas and is provided with an electric circuit mounted thereon containing a current cutting element connected in series to the battery and a voltage detector for detecting battery voltage to control the above current cutting element, an outer cap and an inner cap fixed on the above printed board and are connected respectively to a terminal of one polarity and a terminal of the other polarity of the printed board, a vent made of a thin metal plate which breaks at a certain specified pressure provided at a place inner than the above printed board, and electrical connecting means for electrically connecting a terminal of the printed board coupled with one of the caps to an electrode of either polarity of the electro-generating element via the above vent, both of the caps being provided respectively with a plurality of gas discharge apertures, an open cavity connecting the above apertures through is provided between the two caps, and said vent containing current cutting means which disconnects electrical conduction prior to the breakage of vent itself.

Another aspect of the present application refers to a sealing plate assembly according to the sixth exemplary embodiment a secondary battery, with which an electric circuit containing the current cutting element connected in series to the battery and a voltage detector for detecting battery voltage to control said current cutting element is integrated and put into a single package having terminals equivalent to those of said printed board and the single package is disposed in place of printed board. With the above described structure the printed board turns out to be unnecessary, and a space between the terminals provides a passing channel for gasified electrolyte.

As described in the above, a space for housing a safety circuit may be secured inside the inner cap of a sealing plate assembly in accordance with the present invention. Thus an independent secondary battery having a built-in safety circuit is presented, while the needs for conventional battery package which carries with it an external safety circuit for batteries and has a dedicated design to be suitable to a specific appliance model diminishes.

BRIEF DESCRIPTION OF THE DRAWINGS

FIG. 8(a) is perspective views showing disassembled members of the above sealing portion. FIG. 8(b) is cross sectional views showing disassembled members of the sealing portion.

BEST MODE FOR CARRYING OUT THE INVENTION (Embodiment 1)

A first exemplary embodiment of the present invention is described in the following with reference to FIG. 2 through FIG. 6.

Figure 2:
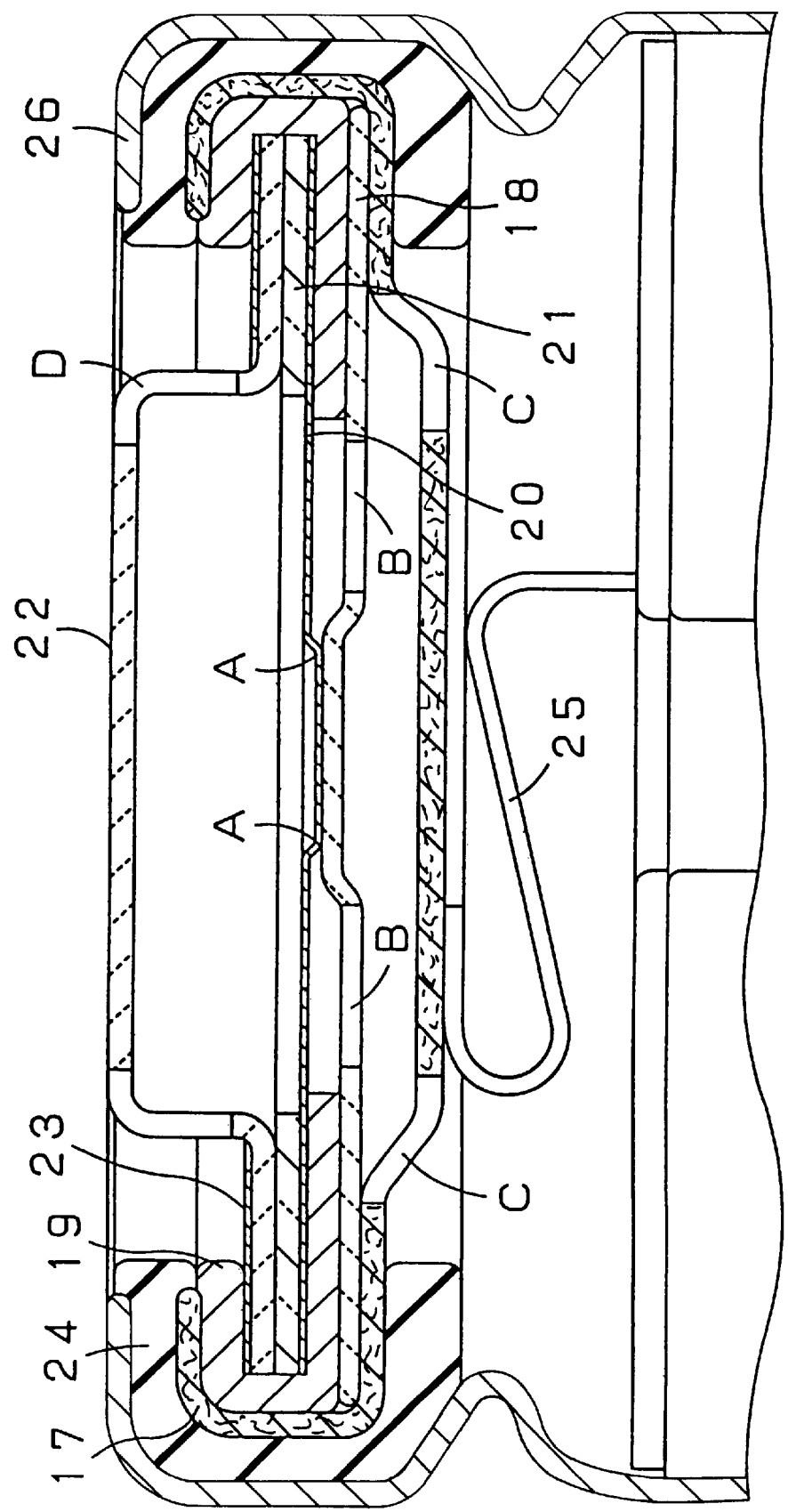
FIG. 2 is a cross sectional view showing the sealing portion of a cylindrical lithium-ion secondary battery in accordance with a first exemplary embodiment of the present invention.

FIG. 2 is a cross sectional view showing the sealing portion of a cylindrical lithium-ion secondary battery. FIG. 3(a) is perspective views of disassembled members of the sealing portion.

Figure 3B:
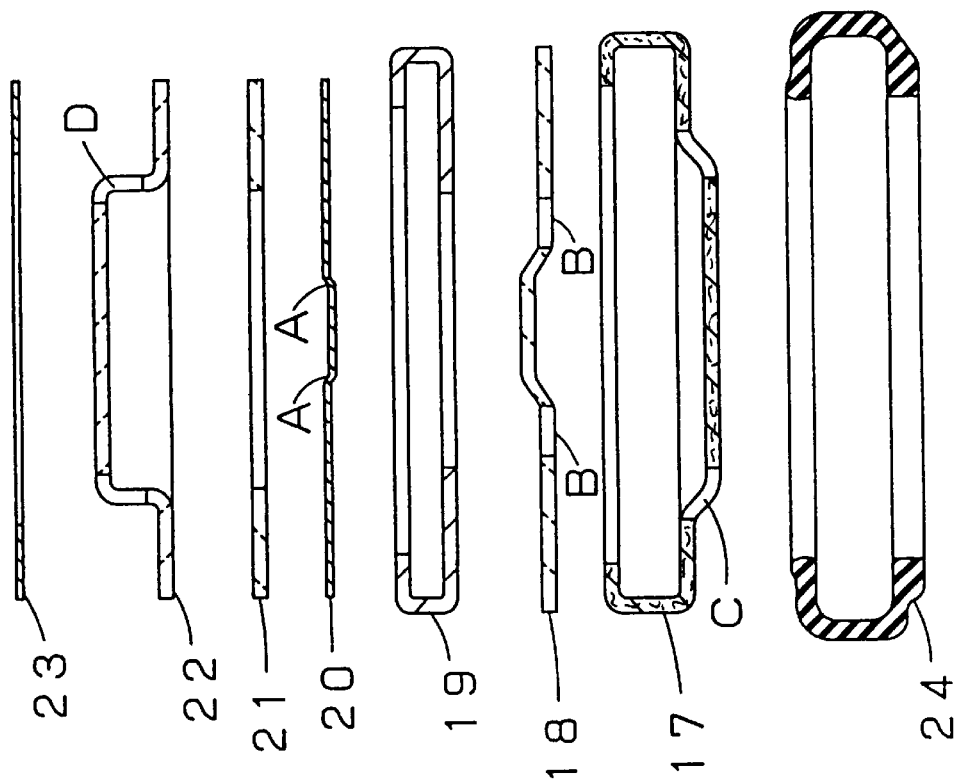
FIG. 3(b) is cross sectional views showing disassembled members of the sealing portion.
Figure 3A:
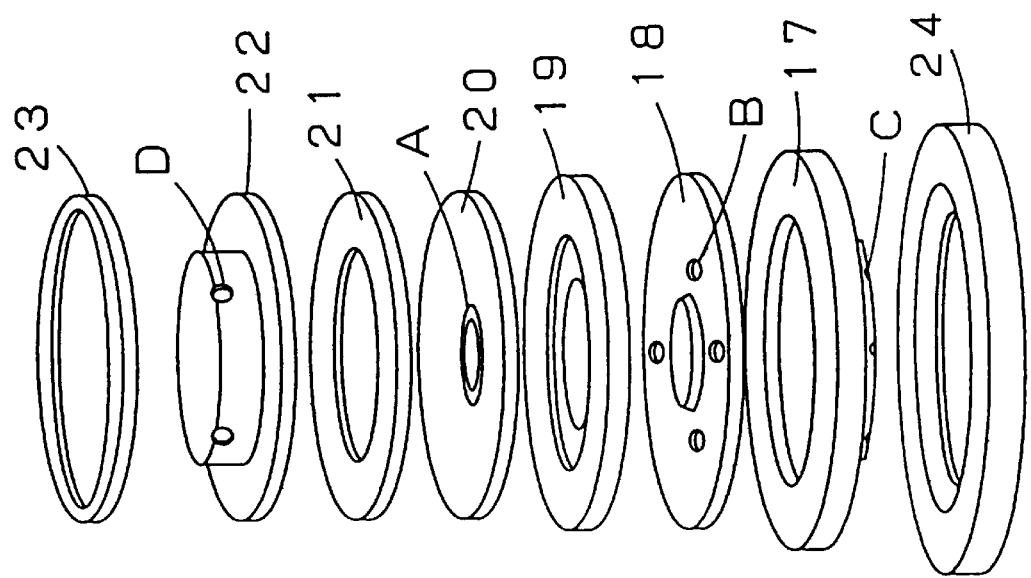
FIG. 3(a) is perspective views showing disassembled members of the sealing portion.

FIG. 3(b) is cross sectional views of disassembled members of the sealing portion. Contained in the sealing portion are a PTC element working as means for reducing electric current when battery temperature went high, a current breaking valve working as means for cutting electric current when pressure within a battery went high, and an anti-bursting valve working as means for preventing bursting of a battery in case the internal pressure increased further; numeral 17 denotes a filter, 18 is a subfilter, 19 is an inner gasket, 20 is a vent, 21 is a PTC element, 22 is a cap, 23 is a sealing plate ring, and 24 is a gasket. Normally, current from the positive electrode is led via a lead plate 25 to filter 17 having an aperture C, and then to subfilter 18 having an aperture B whose surface is in contact with the filter 17. As the subfilter 18 and the vent 20 are welded together at the central part, the current from positive electrode proceeds through the vent 20 and the ring-shaped PTC element 21 whose surface is in contact with the vent 20, eventually to cap 22 having an aperture D.

The cap 22, PTC element 21 and vent 20 are united into a one-piece unit by the ring-shaped inner gasket 19, the inner gasket 19 being made with polycarbonate or other insulator, so the electrical contact between the subfilter 18 and the vent 20 is limited only in the welded section. The circumferential portion of filter 17 clamps the circumferential edges of subfilter 18 and inner gasket 19 together, so these items assume a shape of a one-piece unit constituting an assembly for sealing the open end after the clamping is completed. Gasket 24 is made of an insulator such as polycarbonate formed in a ring shape, so the battery case 26 and filter 17 are kept insulated against each other when said assembly for sealing the open end is affixed to a battery case 26 for sealing by caulking.

The vent 20 is provided with a slit A as the anti-bursting valve functioning as anti-bursting means. In case a gasified electrolyte is generated, it proceeds through aperture C of filter 17 and aperture B of subfilter 18 to push the vent 20 up towards cap 22.

The current reducing function by PTC element 21 is described below. The resistance value of PTC element 21 shows a steep increase when it reaches at a certain temperature. In case the battery temperature is raised by overcharging, or by large discharge current, for example, a discharge current value larger than that equivalent to a 1-hour discharge, reaching at a certain specific temperature, then the resistance value of PTC element 21 steeply goes up to reduce the current. In this way a battery is prevented from falling into thermally unsafe situation.

The current cutting ftnction by the welded subfilter 18 and vent 20 against an increased internal battery pressure is described below. A gasified electrolyte, which may be generated from heated electrolyte, proceeds through aperture C of filter 17, aperture B of subfilter 18, to reach the vent 20 and pushes it up towards cap 22. At a moment when the gas pressure exceeds the welded force between subfilter 18 and vent 20 the welded part is broken and the electrical connection between the two is cut; thus it works as a current cutting valve.

The anti-bursting function of vent 20 is described in the following. After the current cutting function is worked out by the subfilter 18 and the vent 20, when the gasified electrolyte pushes vent 20 further up towards cap 22, the vent 20, which is held firmly at the circumferential edge by inner gasket 19, filter 17, gasket 24 and battery case 26, is broken at slit A by the further increased gas pressure. Then, the gasified electrolyte is freed towards cap 22, and discharged outside through aperture D of cap 22. Thus the internal pressure is reduced and battery bursting is avoided.

Figure 4:
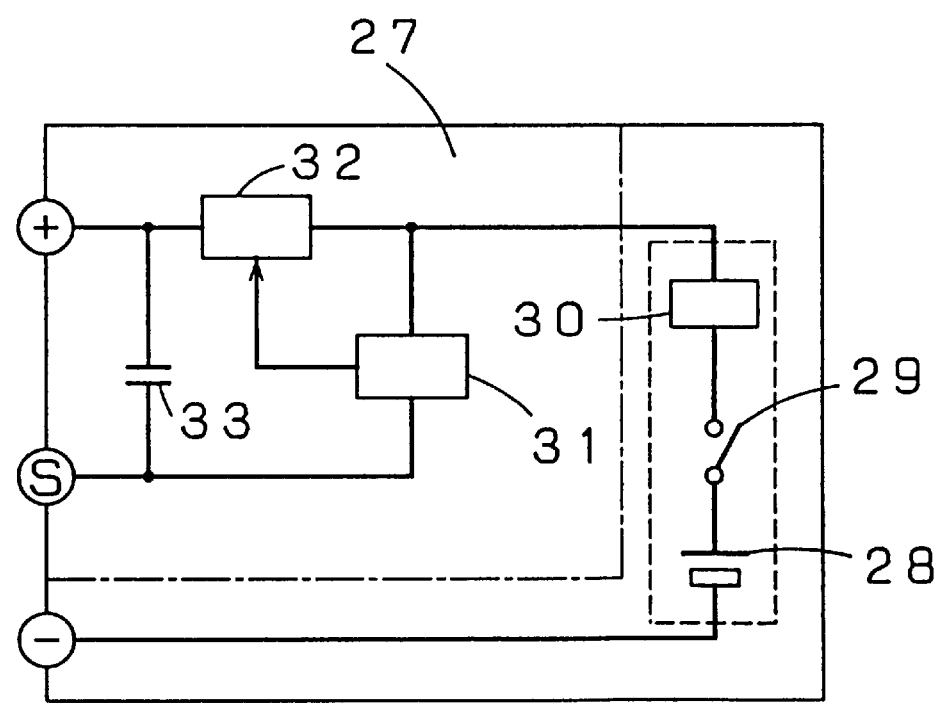
FIG. 4 is a block diagram showing a safety circuit in accordance with a first exemplary embodiment of the present invention.

FIG. 4 is a block diagram of a safety circuit incorporated in an invented lithium-ion secondary battery. In FIG. 4, symbol + represents plus terminal controlled by safety circuit 27 for inputting/outputting of secondary battery 28 with outside, S is minus terminal for safety circuit 27 which is to be coupled, within inside of an appliance or a battery charger, with minus terminal of secondary battery 28 formed on its surface at the side or the bottom. Symbol − represents minus terminal of secondary battery 28 formed on its surface at the side or the bottom.

The positive output of secondary battery 28 is connected via current cutting means 29 of subfilter 18 and vent 20, as described with reference to FIG. 2, and PTC element 30(equals to PTC element 21 of FIG. 2), to safety circuit 27.

During the time when the terminal S is being connected with minus terminal of secondary battery 28 within inside of an appliance or a battery charger, if the voltage between the output end of PTC element 30 and the terminal S is falling within a range of certain specific value a voltage detector 31 built in the sealing portion turns current cutting element 32, e.g. an FET etc., ON, enabling the charging from a charger. If the voltage between the output end of PTC element 30 and the terminal S is higher than a certain specific value the voltage detector 31 turns current cutting element 32, e.g. an FET etc., OFF, protecting the battery 28 from the overcharging.

The safety circuit 27 performs above described functions. In a case where an FET is used for the current cutting element 32, the secondary battery 28 can make current discharging through the + terminal taking advantage of the body diode effect, even when the FET is in OFF state. A capacitor 33 is for anti-electrostatic means between the + and − terminals, aiming to avoid an operation error by noise.

Figure 5:
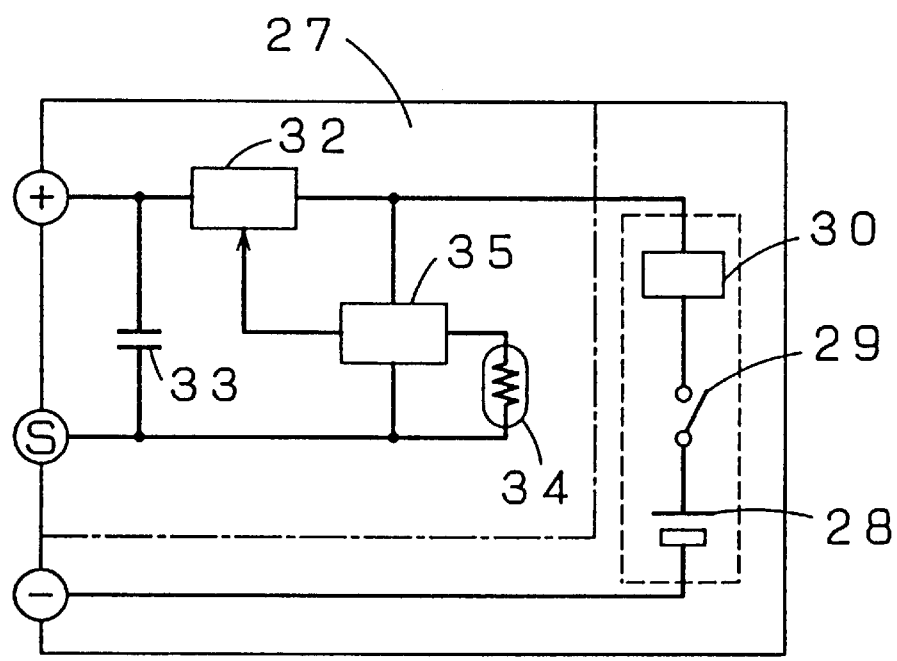
FIG. 5 is a block diagram showing a modification of the safety circuit.

FIG. 5 is a modification of the safety circuit 27 of FIG. 4. What is additional in FIG. 5 is a thermistor 34. The voltage detector 35, which is assigned with an additional function of monitoring the changing resistance value caused as a result of varying temperature of the thermistor 34, turns the current cutting element 32, an FET etc., OFF if the temperature of secondary battery 28 went out of a specified range(e.g. 0 C.–60 C.).

Figure 6:
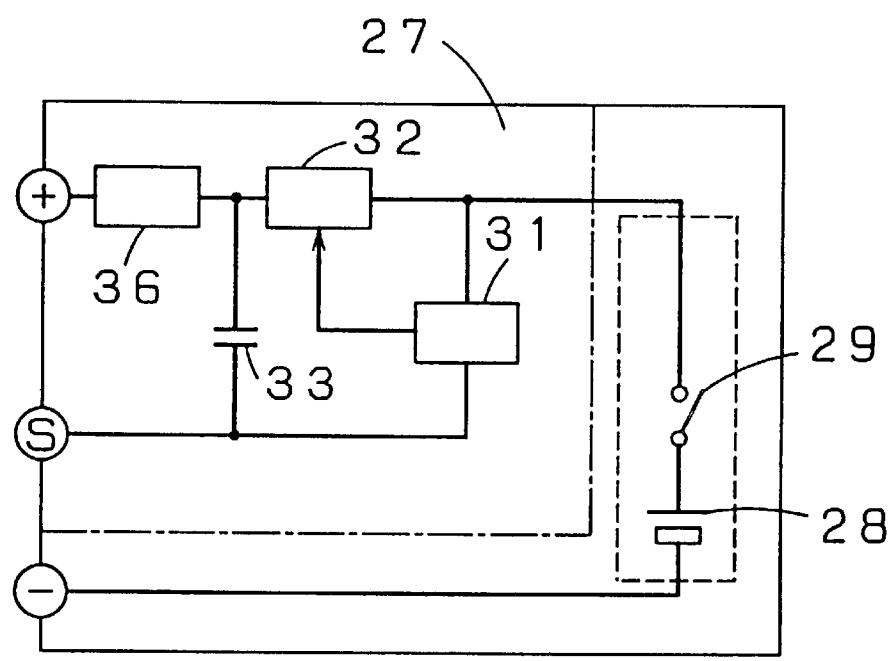
FIG. 6 is a block diagram showing a still other modification of the safety circuit.

FIG. 6 is a still other modification of the safety circuit 27 of FIG. 4. Where, a conventional ring-shaped PTC element (equals to PTC element 21 of FIG. 2) is eliminated, and a PTC element 36 is inserted instead between the plus terminal for safety circuit and the plus terminal for inputting/outputting with outside.

In the above descriptions, the minus voltage to be given to minus terminal S of safety circuit 27 is obtained from the minus terminal of battery case via a connection within inside of an appliance or a battery charger. It is also possible to obtain the minus voltage for safety circuit through direct connection with battery case; in this case, however, a countermeasure has to be taken for a long time storage, because a dissipation due to self discharge caused by consumption by safety circuit 27 during the time when the battery is out of use creates a problem.

(Embodiment 2)

Figure 7:
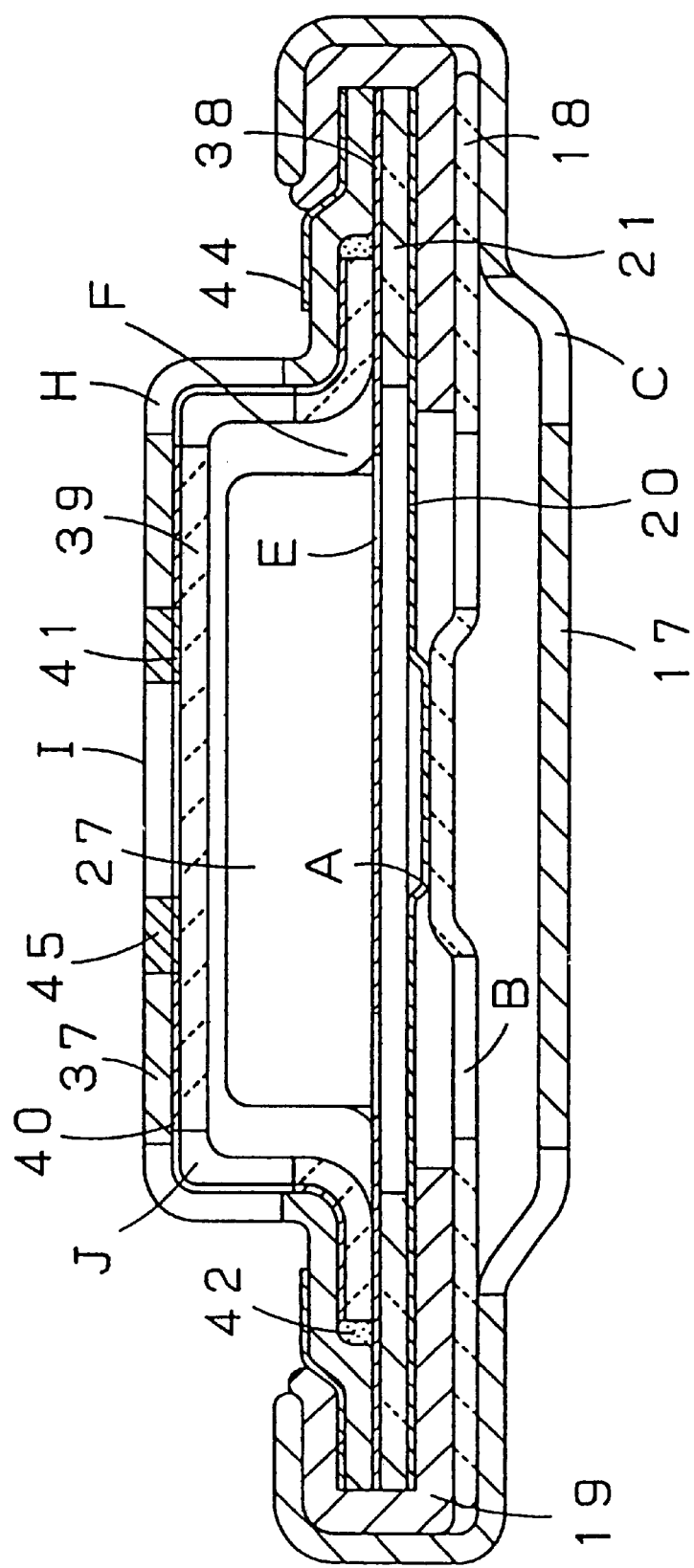
FIG. 7 is a cross sectional view showing the sealing portion of a battery incorporating the safety circuit of FIG. 4 in accordance with a second exemplary embodiment of the present invention.

A secondary battery 28 containing the safety circuit 27 of FIG. 4 in the sealing portion is described in the following with reference to FIG. 7 and FIG. 8. FIG. 7 is a cross sectional view of the sealing portion. FIG. 8(*a*) is perspective views of disassembled members of the sealing portion, FIG. 8(*b*) is cross sectional views of disassembled members of the sealing portion; what is different from the structure of FIG. 2 is in a portion from PTC element 21 through minus terminal 37 for safety circuit.

In FIG. 7 and FIG. 8, terminal of PTC element 21 keeps surface contact with a flexible circuit board 38 made of polyamide, and is coupled to the safety circuit 27 by means of through hole and wiring. Symbol E represents an aperture provided in the flexible circuit board 38 for anti-bursting; which corresponds to an opening in the above described safety circuit substrate, and may be replaced by a breaking mechanism of the above described safety circuit substrate, viz. a portion easily breakable by a pressure given to the substrate. The minus terminal 37 for safety circuit keeps surface contact with the flexible circuit board 38, and is connected with safety circuit 27 by wiring. The secondary battery 28's input/output terminal + controlled by safety circuit 27 provides a plus terminal for input/output of control 39 by way of surface contact through the flexible circuit board 38. Symbol F represents a water-proof, electrolyte-proof coating for safety circuit 27. Numerals 41, 42 denote a thermosetting glue, e.g. an epoxy group resin, 40, 45 are an insulator, e.g. ABS resin, glued and fixed between the minus terminal for safety circuit 37 and the plus terminal for input/output of control 39, and 44 is a sealing ring plate.

(Embodiment 3)

Figure 9:
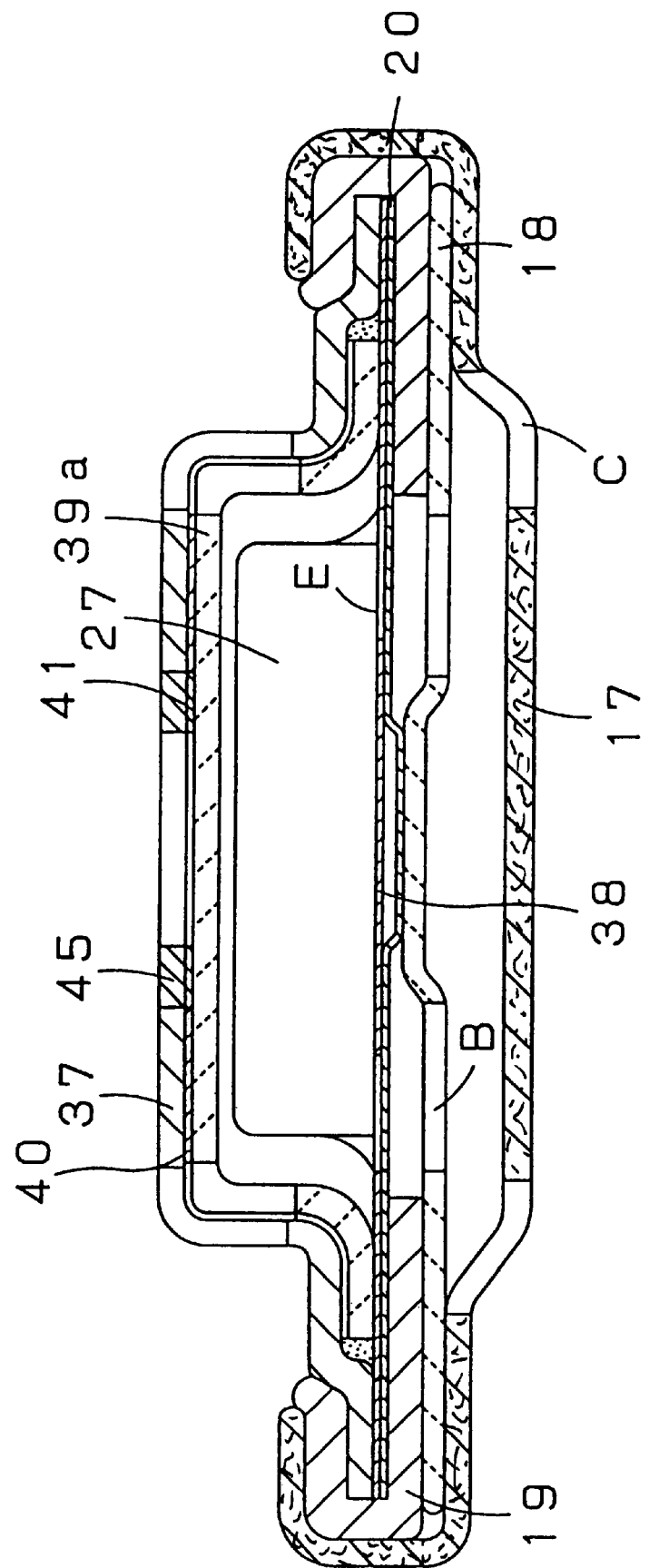
FIG. 9 is a cross sectional view showing the sealing portion in accordance with a third exemplary embodiment.

In a case where a PTC element 36 is provided between the plus terminal for safety circuit and the plus terminal for inputting/outputting with outside, as shown in FIG. 6, a plus terminal for input/output of control 39*a* may be constituted with a PTC element, as shown in FIG. 9. The structure of other portions remains the same as in FIG. 7 and FIG. 8.

(Embodiment 4)

Figure 10:
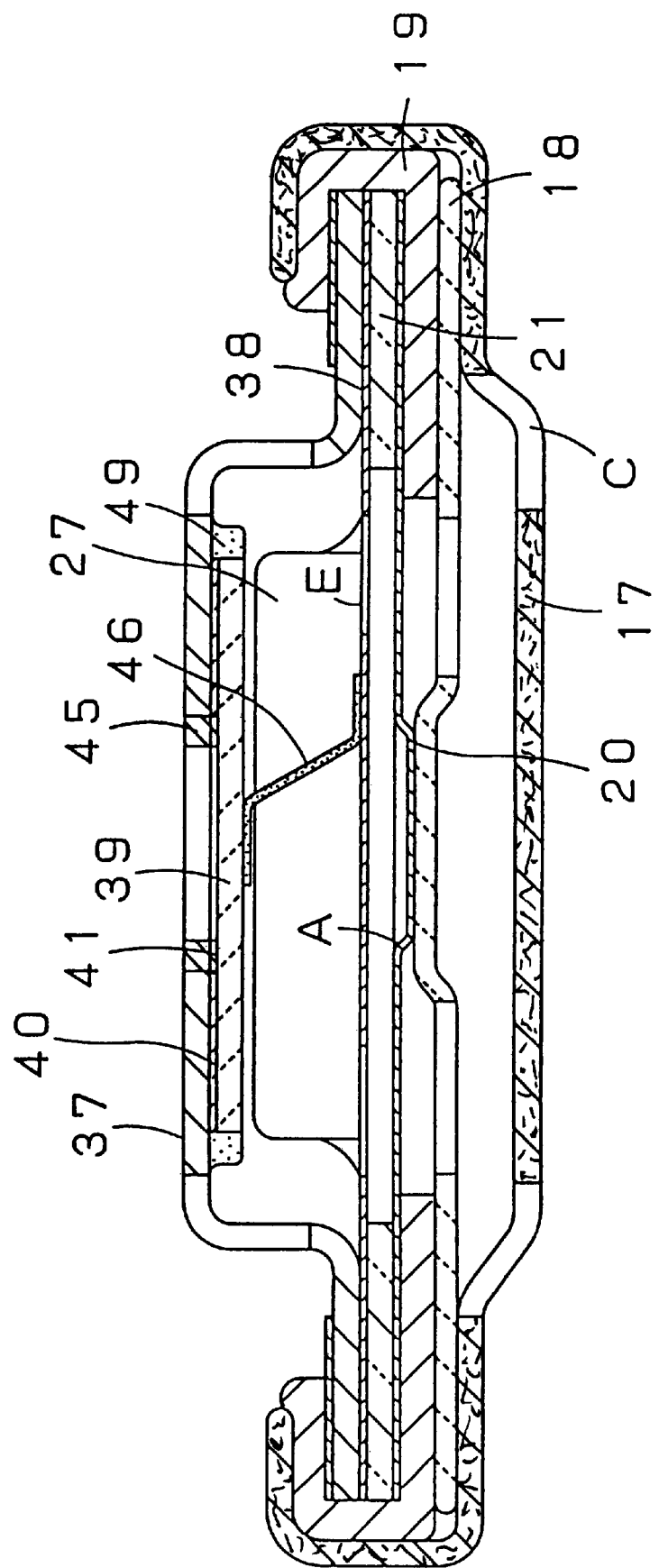
FIG. 10 is a cross sectional view showing the sealing portion in accordance with a fourth exemplary embodiment.

The connection between the plus terminal for input/output of control 39 and the flexible circuit board 38 as shown in FIG. 7 may be made in a way as shown in FIG. 10, where the plus terminal for input/output of control 39 is connected to a component disposed on flexible circuit board 38 by means of a spring member 46 made of e.g. phosphor bronze. The constitution of a battery cap may be simplified by employing the above structure. Furthermore, the bottom surface of flexible circuit board 38 contacts with vent 20 in the surface via PTC element 21, while the upper surface of flexible circuit board 38 contacts with minus terminal for safety circuit 37 in the surface; these contribute to make the whole constitution of sealing portion simplified. Numerals 41, 49 denote a thermosetting glue, such as an epoxy group resin.

Figure 1:
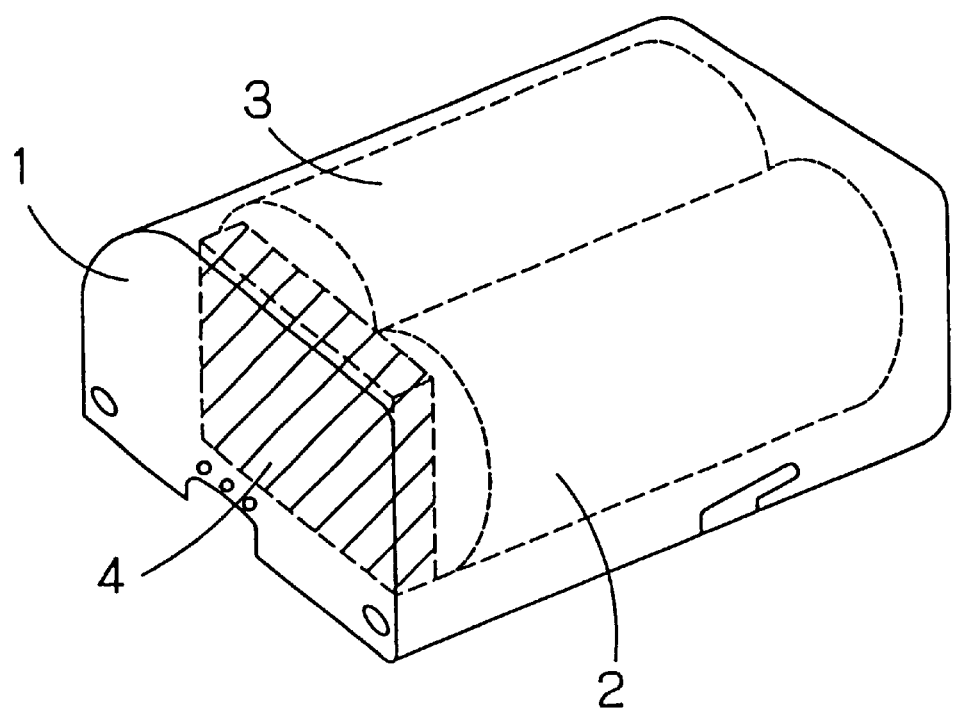
FIG. 1 is a picture of a typical package of lithium-ion secondary batteries.
Figure 11A:
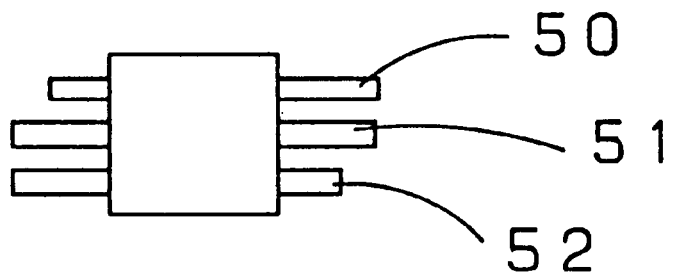
FIG. 11(a) is a front view of a packaged safety circuit.
Figure 11B:
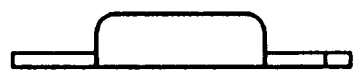
FIG. 11(b) is a side view of the safety circuit.
Figure 11C:
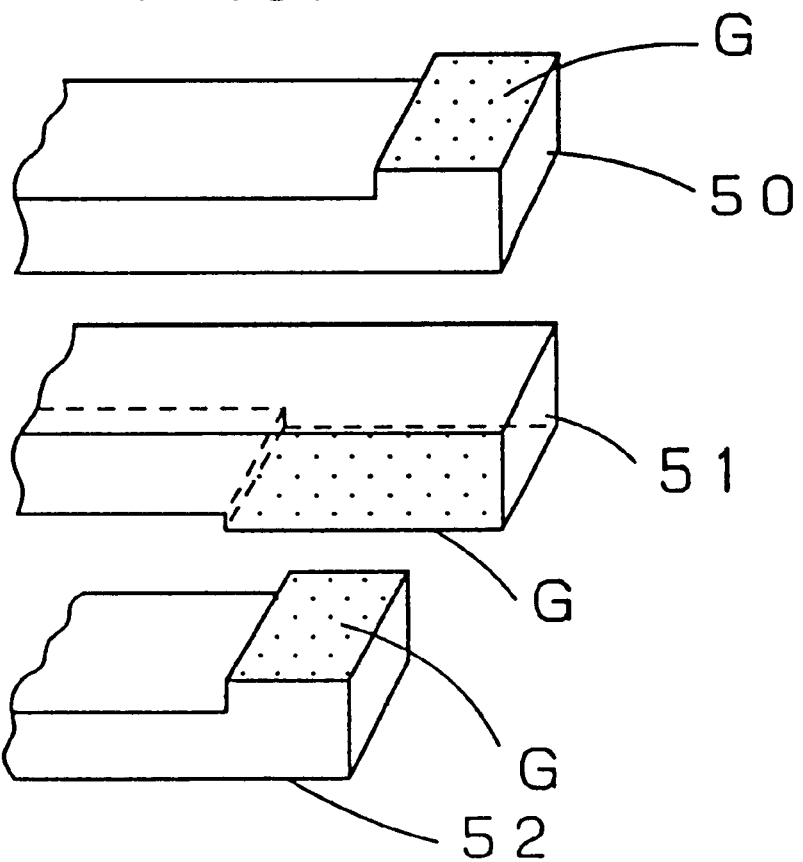
FIG. 11(c) is perspective views showing the disassembled leads of the safety circuit.

The above safety circuit 27 may be integrated in an IC package as shown in FIG. 11. In FIG. 1, numeral 50 denotes a VDD (GND) lead, 51 is a VIN (VSS) lead, and 52 is a VOUT lead; respective leads 50, 51 and 52 may be provided in place of the printed board 38 of FIG. 7. These leads are coated with an electrolyte-proof material, for example PBT (polybutylene terephthalate), excluding regions G which are to make contact with minus terminal for safety circuit 37, PTC element 21 and the plus terminal for input/output of control 39. The above structure makes it possible to eliminate a printed board, and assembling of the sealing part becomes easier. The space created by the leads 50, 51 and 52 equals to the above described open cavity which allows gasified electrolyte to go through.

Figure 12A:
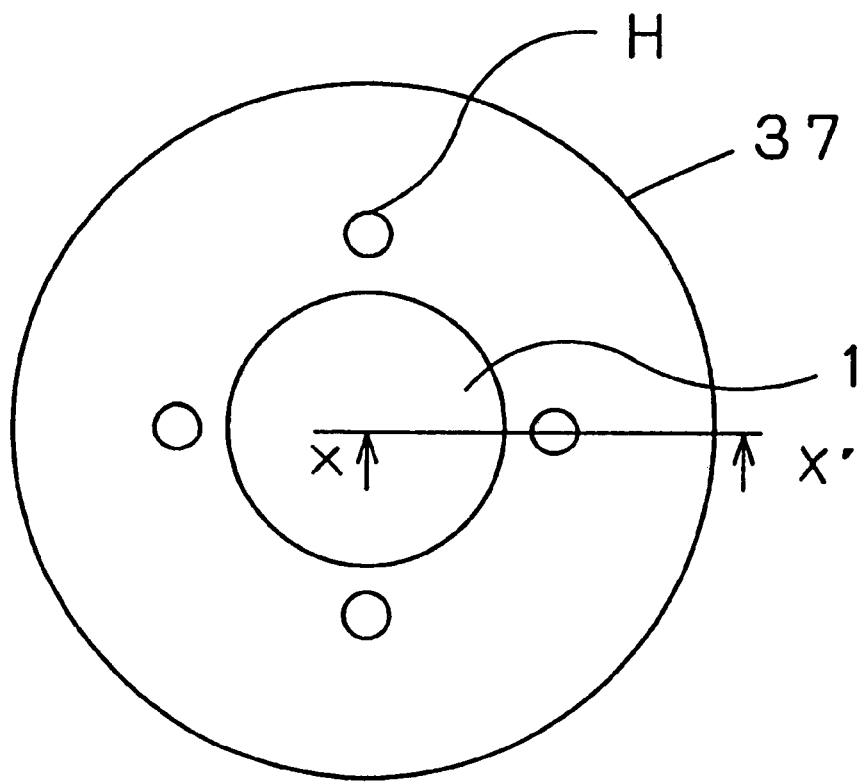
FIG. 12(a) is a front view of minus terminal for the safety circuit.
Figure 12B:
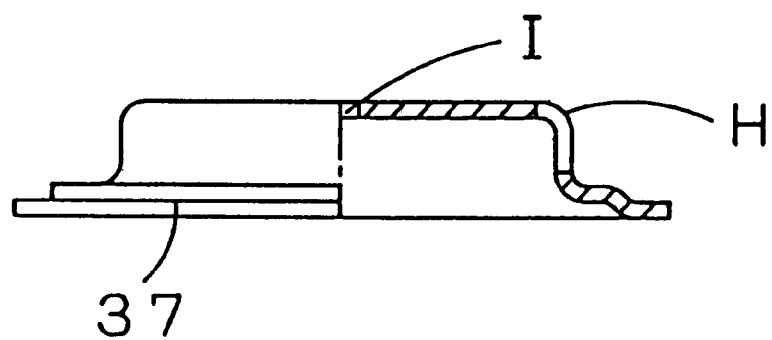
FIG. 12(b) is a cross sectional view at X–X'.
Figure 13A:
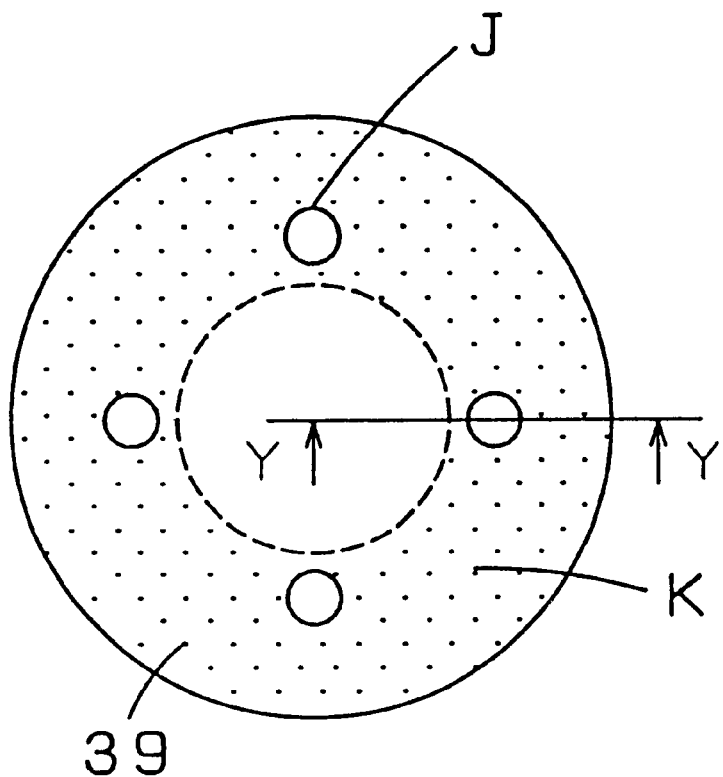
FIG. 13(a) is a front view of plus terminal for input/output of control on secondary battery.
Figure 13B:
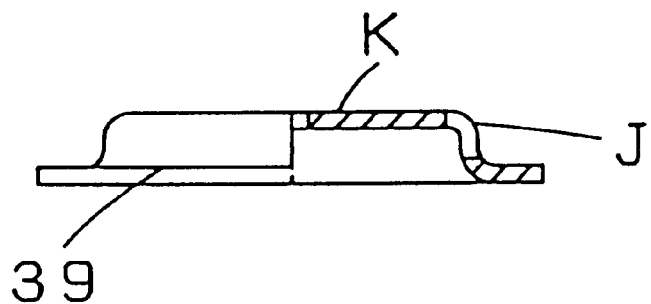
FIG. 13(b) is a cross sectional view at Y–Y'.

The minus terminal for safety circuit 37 of FIG. 7 needs to have a plurality of gas discharging apertures H for anti-bursting, and an aperture I for allowing the plus terminal for input/output of control 39 to make mechanical contact from the surface of minus terminal for safety circuit 37, as shown in FIG. 12; and as shown in FIG. 13, the plus terminal for input/output of control 39 is provided with a plurality of gas discharging apertures J which are larger than the plurality of gas discharging apertures H of minus terminal for safety circuit 37, and is coated with a thermosetting glue, for example an epoxy group resin, in an area K, where a region exposed to the aperture I of the minus terminal for safety circuit 37 which allows mechanical contact to the plus terminal for input/output of control 39 is excluded.

The minus terminal for safety circuit 37 and the plus terminal for input/output of control 39 may be formed into a one-unit from metal plates, e.g. nickel, perforated respectively in advance and coated with an epoxy group resin or other thermosetting glue.

(Embodiment 5)

Figure 14:
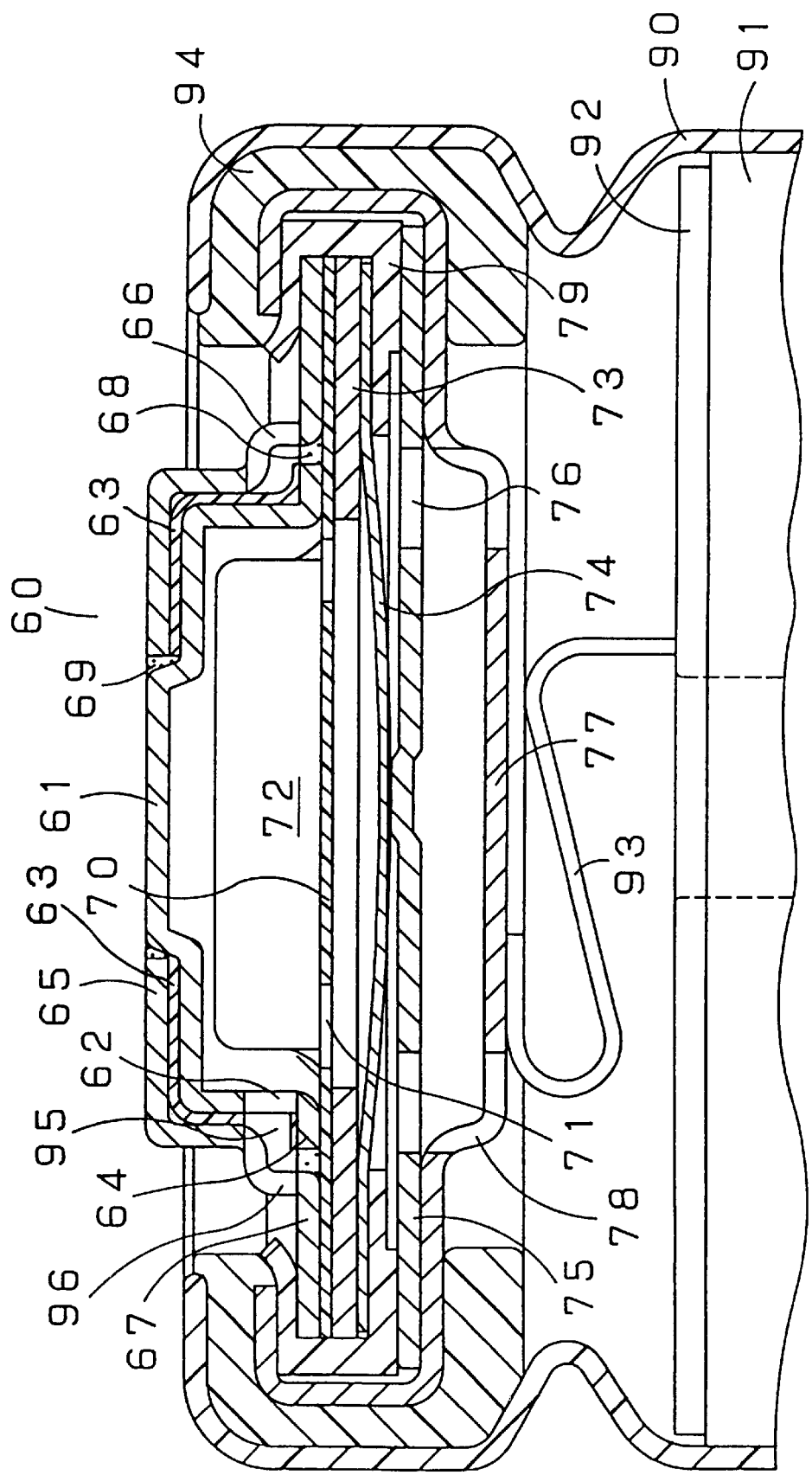
FIG. 14 is a cross sectional view showing an essential portion of a lithium-ion battery containing a sealing plate assembly in accordance with a fifth exemplary embodiment.

FIG. 14 is a cross sectional view showing key portion of a lithium-ion secondary battery incorporating a sealing plate assembly in accordance with a fifth exemplary embodiment. The present sealing plate assembly 60 comprises an inner cap 61, an outer cap 65 and a printed board 70 having an element 72 thereon.

The sealing plate assembly further comprises a ring-shape PTC element 73 disposed beneath the printed board 70, a vent 74 made of thin metal plate, a subfilter 75 welded to the vent 74 at the center and having an aperture 76 for gas discharge, a filter 77 having an aperture 78 for gas discharge, and an inner gasket 79. The inner gasket 79, which covers around the circumferential part of outer cap 65 and the circumferential part of vent 74, is blocking electrical contact between vent 74 and subfilter 75 at their circumferential part. The circumferential edge of filter 77 clamps around subfilter 75 and inner gasket 79 together at their circumference, uniting these members as a one-piece sealing plate assembly. The circumferential part of the upper surface of filter 77 is blocked from the electrical contact with outer cap 65, printed board 70, PTC element 73, and the circumferential part of vent 74 by means of the inner gasket 79.

The above printed board 70 is described hereunder further in detail. The printed board 70 is a flexible insulator board having wiring in it; on which a packaged element 72 housing an electric circuit constituting a safety circuit to be referred to later is mounted and fixed at the center, and inner cap 61 and outer cap 65 are attached and fixed, covering the element 72, on the board with an electrically insulating glue 68, e.g. an epoxy resin. A plurality of gas discharge apertures 71 are provided in the printed board 70.

The inner cap 61 has four gas discharge apertures 62, and is covered with an insulating film 63 over the outer surface for electrical insulation against outer cap 65. The shape of outer cap 65 has an outward extrusion 96 for forming an open cavity 95 against inner cap 61 intending to provide a gas path, and the extrusion 96 is provided with four gas discharge apertures 66. A glue 69 is intervening between inner cap 61 and outer cap 65 for insulation at their upper part. The printed board 70, on which the element 72 is mounted, is provided with wirings so that the minus terminal is connected with flange 64 of inner cap 61, and the plus terminal with flange 67 of outer cap 65 and PTC element 73.

The sealing plate assembly 60 of the above described structure is affixed to open end of battery case 90. Stored inside the battery case 90 is an electrode plate group 91, which contains positive electrode plate and negative electrode plate wound in a whirlpool shape with a separator in between. One electrode among the above electrode plate group, for example the positive electrode lead plate 93, is welded to filter 77 of sealing plate assembly 60, the sealing plate assembly 60 is fitted with gasket 94 at the circumference, and the gasket is caulked by the top end of battery case 90; thus the battery case 90 is sealed liquid tight and airtight. Numeral 92 represents an insulating plate. The negative electrode plate(not shown) of the electrode plate group 91 is welded to the bottom of battery case. Therefore, the battery case 90 functions also as the negative terminal.

When the sealing plate assembly 60 is thus affixed to battery case 90, the outer cap 65 is coupled to the positive electrode plate of the electrode plate group 91 via printed board 70, PTC element 73 which has contact with the printed board 70, vent 74 which has contact with the PTC element 73, subfilter 75 which is welded with the vent 74 at the center, and filter 77; the outer cap 65 works as the positive terminal.

Figure 16:
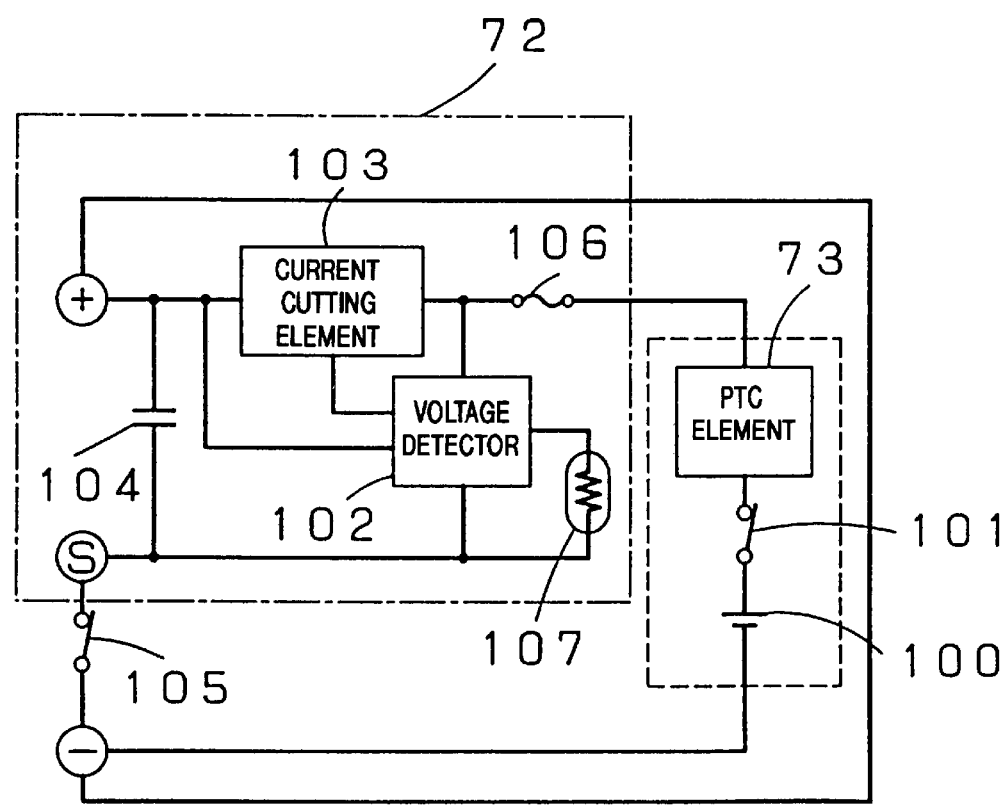
FIG. 16 is a block diagram of an electric circuit containing a safety device built in a battery.
Figure 17:
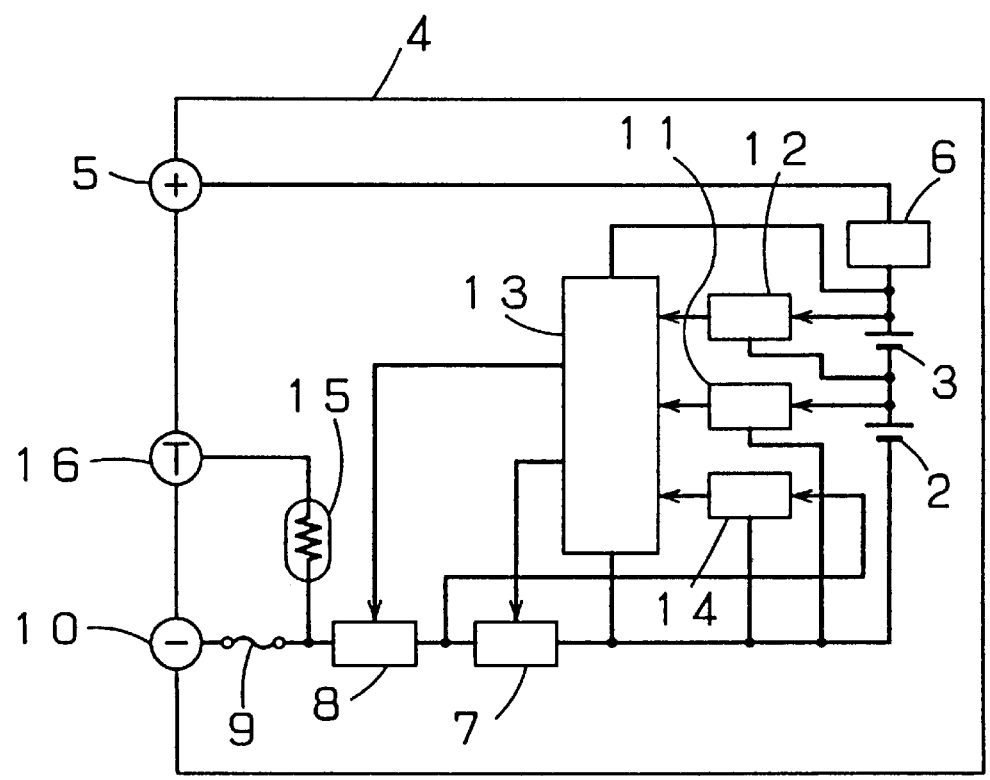
FIG. 17 is a block diagram of a conventional safety circuit used in a lithium-ion secondary battery package.

Now in the following a safety device of FIG. 16 is described. In FIG. 16, numeral 100 represents a secondary battery sealed with the sealing plate assembly 60, 101 is a switch constituted by a welded section between the subfilter 75 which is connected with the positive electrode of battery and the vent 74 functioning as current cutting means. A PTC element 73 is connected in series to the switch 101. A packaged electric circuit element 72 contains thermal fuse 106 and current cutting element 103 connected in series to the PTC element 73, voltage detector 102 for detecting the voltage to control the current cutting element 103, thermistor 107, and capacitor 104.

The plus terminal of element 72 is connected to outer cap 65, while the minus terminal S is connected to inner cap 61 which is coupled to the negative terminal of battery via a switch 105. Therefore, when a battery is installed in an appliance the minus terminal of appliance coupled to battery case, which being the negative terminal of the battery, is electrically connected with the inner cap 61. Namely, the switch 105 is turned ON when a battery is installed in an appliance.

When a battery having the sealing plate assembly 60 is installed in an appliance and the switch 105 is turned ON, a certain voltage is applied between the output end of PTC element 73 and the terminal S, the voltage detector 102 turns the current cutting element 103 ON, making ready for receiving charging current from a battery charger. When voltage of battery 100 represented by a voltage between the output end of PTC element 73 and the terminal S goes higher than a specified value, the voltage detector 102 turns the current cutting element 103 OFF, protecting the battery 100 from over-charging current.

The safety circuit incorporated in element 72 is described further in detail. The voltage detector 102 controls current cutting element 103 detecting the voltage of battery 100 and the voltage of current cutting element 103. If the voltage of battery 100 detected by voltage detector 102 is higher than the upper limit of a specified voltage range, it represents the over-charging, whereas if the voltage of battery 100 detected by voltage detector 102 is lower than the lower limit of a specified voltage range, it represents the over-discharging. The voltage detector 102 turns current cutting element 103 OFF when the detected battery voltage is higher than the upper limit or lower than the lower limit of a specified voltage range; the electric current is disconnected. The voltage detector 102 also detects the voltage between the input end and the output end of current cutting element 103 consisted of, for example, a field-effect transistor(FET); if it goes higher than a certain specified voltage, for example, when there is an excessive current due to short-circuiting, the current cutting element 103 is turned OFF.

The voltage detector 102 further detects voltage of thermistor 107; if temperature of battery 100 or current cutting element 103 went out of a certain specified range, for example, when battery temperature went out of a temperature range 0 C–60 C, the current cutting element 103 is turned OFF. A thermal fuse 106 is broken by an abnormal heat generated by battery 100 or current cutting element 103, to work as a safety device.

The safety circuit incorporated in element 72 performs the above described functions. If an FET is used for the current cutting element 103, battery 100 is able to make discharging through the plus terminal taking advantage of the body diode effect, even when it is in OFF state. A capacitor 104 is for anti-electrostatic means between the plus terminal and the minus terminal to avoid operating error due to noise. The resistance value of PTC element 73 shows sudden increase when it reaches at a certain specific temperature. When battery temperature is raised by an over-charging current, or by a large discharge current, for example a current larger than current value equivalent to one-hour discharge rate, and the PTC element 73 reaches at a specific temperature, then the resistance value shows a sharp increase curtailing the electric current. Thus the battery is prevented from falling into a thermally unstable state. It is also possible to have the PTC element 73 incorporated within the element 72.

Next, description is made on how the sealing plate assembly work when the pressure within battery went high. In case the temperature within battery went high, despite the functioning of safety circuit and PTC element as described above, and the electrolyte, whose main ingredient is an organic solvent, is gasified, the gas goes through aperture 78 of filter 77 and aperture 76 of subfilter 75 to push up the vent 74 towards printed board 71. The welded part between subfilter 75 and vent 74 is broken as soon as the gas pressure goes higher than the welding force between the two, and the electrical connection between subfilter 75 and vent 74 is broken. As a result of the above action, electrical connection between the battery and charging circuit and/or discharging circuit of a battery is totally broken. As described above, the subfilter 75 and the vent 74 work as an electric current breaking switch, or current cutting means.

In case the gas pressure is raised further, the vent 74 is pushed up further towards printed board 71. As soon as the gas pressure goes higher than a certain value, the vent 74 starts breaking at a notch(not shown) provided on a part of the surface. Then the gas proceeds through the gap of broken vent, aperture 71 of printed board, aperture 62 of inner cap 61, open cavity 95 between inner cap 61 and outer cap 65, to aperture 66 of outer cap 65, to be discharged outside.

Even if the aperture 62 and the aperture 66 of respective caps are not aligned at a same place, the gas coming through aperture 62 can easily reach aperture 66 by way of the open cavity 95 which is provided between inner cap 61 and outer cap 65. If no cavity 95 is provided, a bulk of the gas generated at once may face a difficulty in passing through a narrow gap between the two caps unless the apertures 62 and 66 are aligned at a same place; a structure without the open cavity 95 may result in an over pressure within the battery and a possibility of battery bursting.

As described in the above, in case pressure within a battery is raised unusually high by some reason, such as the electrolyte gasified by high temperature of a battery, the current cutting mechanism consisted of subfilter 75 and vent 74 cuts the electric current; if the gas pressure is raised even higher the vent 74 breaks itself as anti-bursting means, and the gas is discharged outside through apertures of caps 61 and 65. Thus the battery is freed from the danger of bursting.

(Embodiment 6)

Figure 15:
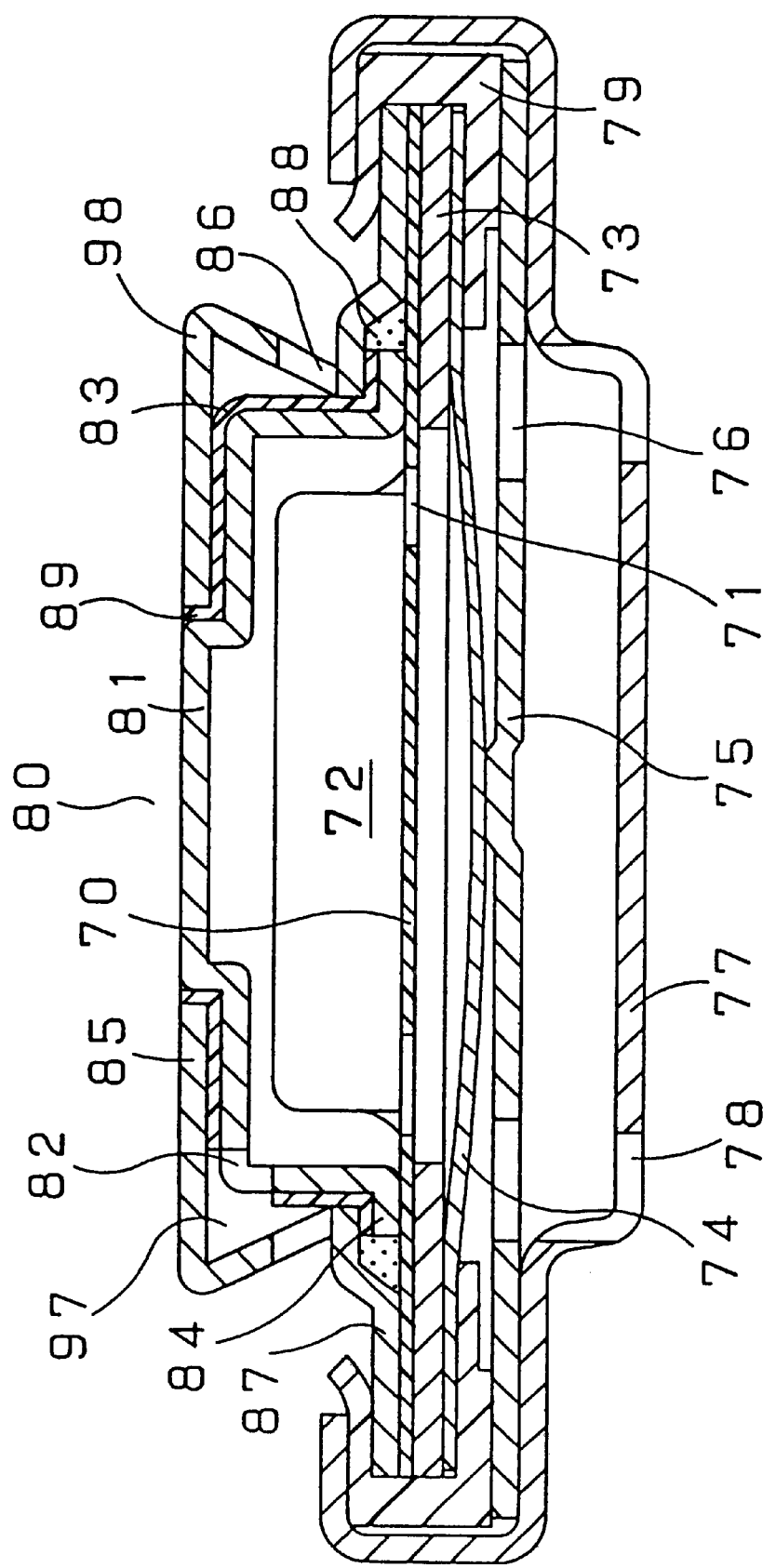
FIG. 15 is a cross sectional view showing an essential portion of a sealing plate assembly in accordance with a sixth exemplary embodiment.

FIG. 15 is a cross sectional view showing a key portion of a sealing plate assembly in accordance with the present embodiment. There is no difference of principle in the structure of the sealing plate assembly 80 as compared with sealing plate assembly 60 of Embodiment 5, except in the inner cap 81 and outer cap 85. Both of the caps are fixed respectively on a printed board 70 with glue 88, in a manner the flange 84 of inner cap 81 gets contact with the minus terminal of printed board 70 and the flange 87 of outer cap 85 gets contact with the plus terminal of printed board 70. The inner cap 81 is provided with a gas discharging aperture 82 at an upper part of the side.

The outer cap 85 is provided with a gas discharging aperture 86 at a lower part of the side, and is designed to have an outward extrusion around the upper circumference so as to provide an open cavity 97 against inner cap 81. The extrusion 98 may be utilized also as a member of snapping hook to a terminal of an appliance when installing the battery in the appliance. In a same manner as in Embodiment 5, the outer surface of inner cap is covered with an insulating film 83 and an insulating glue 89 is provided between the two caps for insulation against each other.

The gas which broke vent 74 and intruded through aperture 82 of inner cap 81 can easily proceed to aperture 86 of outer cap 85 making use of the open cavity 97, to be discharged outside. As the aperture 86 of outer cap 85 provided for discharging the gas outside is located at a level lower than the aperture 82 of inner cap 81, there may be least possibility for a wire-shaped casual metal item coming from the aperture of outer cap into the open cavity provided against the inner cap to cause electrical contact between the two caps resulting in short-circuiting of a battery.

Although four apertures are provided in each of the inner cap and the outer cap for gas discharge in the above described exemplary embodiment, an appropriate number of apertures may be provided according to the size of aperture and the battery.

Although in the above descriptions the positive electrode of battery is electrically connected to the outer cap, it is also possible to connect the positive electrode to the inner cap.

Although in the above descriptions the PTC element is inserted as one component item between the printed board and the vent, it is also possible to have the PTC element incorporated within the element 72 disposed on the printed board.

The materials described in the above exemplary embodiments are for the purpose of showing examples, other materials may of course be used so long as they respectively serve a certain specified purpose.

Although in the above exemplary embodiments the present invention has been described for the application to the lithium-ion secondary batteries, the present invention may of course be applied to other types of secondary batteries.

INDUSTRIAL APPLICABILITY

The present invention presents a secondary battery which controls in itself to avoid the over-charging and the over-discharging, and prevents the occurrence of unusually high gas-pressure within battery; in case the gas-pressure within battery eventually rose to an unusually high level the gas is quickly discharged outside and the bursting of battery is prevented.

By embodying the present invention in the above described modes, the following drawbacks of the conventional battery packages may be improved:

1) The case of a packaged battery is designed to be suitable for the installation in a specific appliance model. Therefore, it is inevitable for a packaged battery to take a shape dedicated to a certain appliance model.
2) As the case of a packaged battery is designed to fit for installation in a specific appliance model, the battery charger also has to be a dedicated model that fits to the packaged battery or for incorporation in a battery chamber of the appliance.
3) The gross volume of a packaged battery containing a safety circuit and terminals housed in a package which is designed to be suitable for installation in a certain appliance model becomes unexceptionally greater than the total volume of batteries housed in the package.
4) It is difficult for a general consumer to obtain lithium-ion or other types of secondary batteries in the form of a single cell.

Moreover, if the size of lithium-ion or other types of secondary batteries is standardized, the battery manufacturers can manufacture and supply abundantly the secondary batteries without being restricted by shape, design, release schedule and quantity of various appliances marketed. General consumers in the market also benefit from the above standardization; namely, the consumers buying an appliance which uses the above described standardized batteries can readily acquire the secondary batteries at any time for any desired quantities in the market.

What is claimed is:

1. A secondary battery comprising:
an electronic safety circuit containing a voltage detector and an FET as a current cutting element, the FET turning the current on and off in accordance with a voltage detector value, incorporated in a sealing cap for sealing the battery, wherein a substrate board having the electronic safety circuit disposed thereon is provided with an opening or a breakaway structure.

2. The secondary battery of claim 1, wherein the electronic safety circuit is covered by a water-resistive, anti-electrolyte resin coating comprising one of an epoxy resin and a polybutylene terephthalate resin.

3. The secondary battery of claim 1, wherein a thermistor is provided in the electronic safety circuit.

4. The secondary battery of claim 1 wherein the current cutting element turns off the current, when the battery is over-charged or over discharged.

5. A secondary battery comprising:
an electronic safety circuit containing a voltage detector and an FET as a current cutting element, the FET turning the current on and off in accordance with a voltage detector value, incorporated in a sealing cap for sealing the battery, wherein a thermal fuse is provided in the electronic safety circuit.

6. A secondary battery comprising:
an electronic safety circuit containing a voltage detector and an FET as a current cutting element, the FET turning the current on and off in accordance with a voltage detector value, incorporated in a sealing cap for sealing the battery, wherein a plus output of secondary battery is connected to the electronic safety circuit via a PTC element.

7. A secondary battery comprising:
an electronic safety circuit containing a voltage detector and an FET as a current cutting element, the FET turning the current on and off in accordance with a voltage detector value, incorporated in a sealing cap for sealing the battery, wherein a PTC element is provided between a plus terminal of the electronic safety circuit and a plus terminal for inputting/outputting with outside.

8. A secondary battery comprising:
an electronic safety circuit containing a voltage detector and an FET as a current cutting element, the FET turning the current on and off in accordance with a voltage detector value, incorporated in a sealing cap for sealing the battery, wherein the sealing cap is comprised of two terminals being insulated from one another, a minus terminal being connected to the electronic safety circuit and a plus terminal for inputting/outputting with outside.

9. The secondary battery of claim 8, wherein the minus terminal is disposed at a level one of above and below the plus terminal.

10. The secondary battery of claim 8, wherein the minus terminal of the electronic safety circuit and the plus terminal for inputting/outputting with outside are glued together with an electrically insulating glue, or are assembled together with an insulator therebetween.

11. The secondary battery of claim 8, wherein a first diameter of gas discharge aperture provided in the plus terminal for inputting/outputting with outside is made to be larger than a second diameter of gas discharge aperture provided in the minus terminal for safety circuit.

12. A secondary battery comprising a battery case for housing an electro-generating element, said battery case functioning also as a terminal representing one polarity of the electro-generating element, and
a sealing plate assembly affixed to open end of the battery case via a gasket, wherein said sealing plate assembly contains
a printed board having an electronic safety circuit disposed thereon,
an inner cap and an outer cap electrically insulated from each other, and
a vent made of a metal plate which breaks at a predetermined pressure and functions as electric current cutting means that disconnects electrical conduction prior to the breakage; one cap among said caps being electrically connected via said printed board and said vent to the other polarity of the electro-generating element, both of the caps being provided respectively with gas discharge apertures, and an open cavity formed between the two caps, wherein each of said gas discharge apertures extends into said open cavity.

13. The secondary battery of claim 12, wherein said inner cap includes an upper section and a side section having a plurality of inner cap apertures therein and said outer cap includes a top section and an outer side section having a plurality of outer cap apertures therein, and an open cavity is provided inside the outer side section.

14. The secondary battery of claim 13, wherein an outward extrusion is provided at an upper circumference of outer cap.

15. The secondary battery of claim 13, wherein said plurality of outer cap apertures are disposed at a level lower than said plurality of inner cap apertures.

16. The secondary battery of claim 14, wherein the outer cap apertures are disposed at a level lower than said inner cap apertures.

17. A secondary battery comprising a battery case for housing an electro-generating element, said battery case functioning also as a first terminal representing one polarity of the electro-generating element, and
a sealing plate assembly affixed to open end of the battery case via an electrically insulating gasket, wherein said sealing plate assembly comprises
printed board having an aperture or a breakaway mechanism for discharging gas and is provided with an electronic circuit mounted thereon, said electronic circuit containing an electric current cutting element connected in series to the battery and a voltage detector for detecting battery voltage to control said electric current cutting element,
an outer cap and an inner cap coupled respectively to a second terminal of one polarity of the printed board and a third terminal of the other polarity of the printed board,
a vent made of a metal plate which breaks at a predetermined pressure provided below said printed board, said vent functioning as electronic current cutting means that disconnects electrical conduction prior to the breakage, and electrical connecting means for electrically connecting one of the terminals of the printed board coupled with one of the caps to an electrode of the other polarity of the electro-generating element via said vent; both of the caps being provided respectively with gas discharging apertures, an open cavity formed between the two caps wherein each of said gas discharge apertures extends into said open cavity, and said electronic circuit is connected via the other cap to said first terminal.

18. The secondary battery of claim 17, wherein the electrical connecting means contains a PTC element.

19. The secondary battery of claim 17, wherein the electrical connecting means includes a subfilter centrally welded to the vent and being electrically insulating at a circumference thereof, said subfilter having an aperture which allows gas to go through, a welded portion formed between said subfilter and said vent adapted to break thereby disconnecting the subfilter from the vent when gas pressure posed on the vent exceeds a predetermined value, said subfilter welded to the vent thereby functioning as electronic current cutting means.

20. The secondary battery of claim 17, wherein the electronic circuit containing the current cutting element connected in series to battery and a voltage detector for detecting battery voltage to control said current cutting element is integrated and put into a package having terminals equivalent to those of said printed board, which package being disposed in place of said printed board.

21. The secondary battery of claim 17, wherein an electronic current cutting element contained in the electronic circuit is controlled so as to block the incoming of excessive current to said secondary battery, the outgoing of excessive current from a battery, or the inputting/outputting of excessive current.

22. The secondary battery of claim 17, wherein said inner cap includes an upper section and a side section having a plurality of inner cap apertures therein and said outer cap includes a top section and an outer side section having a plurality of outer cap apertures therein, and an open cavity is provided inside the outer side section.

23. The secondary battery of claim 22, wherein the outer cap apertures are disposed at a level lower than said inner cap apertures.

24. A sealing plate assembly for a secondary battery comprising
   an inner cap and an outer cap electrically insulated from each other,
   a vent comprised of a metal plate which breaks at a predetermined pressure functioning as current cutting means for disconnecting electrical conduction prior to the breakage, and
   means for electrically coupling one of said caps to an electrode of one polarity of an electro-generating element via a printed board with circuitry thereon, and said vent; both of the caps having respectively gas discharge apertures, and an open cavity formed between the two caps, each of said gas discharge apertures extending into said open cavity.

25. A sealing plate assembly for a secondary battery comprising
   a printed board having an aperture or a breakaway mechanism for discharging gas and is provided with an electronic circuit mounted thereon, said electronic circuit containing an electric current cutting element connected in series to the battery and a voltage detector for detecting the battery voltage to control said electronic current cutting element,
   an outer cap and an inner cap fixed on said printed board and connected respectively to a terminal of one polarity and a terminal of the other polarity of the printed board,
   a vent comprised of a metal plate which breaks at a predetermined pressure provided below said printed board, said vent functioning as electronic current cutting means that disconnects electrical conduction prior to the breakage, and
   electrical connecting means for electrically connecting a terminal of the printed board coupled with one of the caps to an electrode of either polarity of an electro-generating element via said vent; both of the caps being provided respectively with gas discharging apertures, and an open cavity formed between the two caps, wherein each of said gas discharge apertures extends into said open cavity.

26. A sealing plate assembly for a secondary battery comprising:
   a package having integrated therewithin an electronic circuit containing an electric current cutting element connected in series to the battery, and a voltage detector for detecting the battery voltage to control said electronic current cutting element integrated therewithin,
   an outer cap and an inner cap fixed on said package and connected respectively to a terminal of one polarity and a terminal of the other polarity of the package,
   a vent comprised of a metal plate which breaks at a predetermined pressure provided below said package, said vent functioning as electronic current cutting means that disconnects electrical conduction prior to the breakage, and
   electrical connecting means for electrically connecting a terminal of the package coupled with one of the caps to an electrode of either polarity of the electro-generating element via said vent; both of the caps being provided respectively with gas discharging apertures, and an open cavity formed between the two caps, wherein each of said gas discharge apertures extends into said open cavity.

* * * * *